(12) United States Patent  (10) Patent No.: US 8,251,430 B2
Ishii et al.  (45) Date of Patent: Aug. 28, 2012

(54) VEHICLE SEAT RECLINING DEVICE (75) Inventors: Koji Ishii, Nagoya (JP); Satoshi Umezu, Nagoya (JP)

(73) Assignee: Ansei Corporation, Obu-Shi (JP)

( * ) Notice: Subject to any disclaimer, the term of this patent is extended or adjusted under 35 U.S.C. 154(b) by 90 days.

(21) Appl. No.: 13/020,220

(22) Filed: Feb. 3, 2011

(65) Prior Publication Data

US 2011/0187171 A1   Aug. 4, 2011

(30) Foreign Application Priority Data

Feb. 4, 2010  (JP) ................................ 2010-023580

(51) Int. Cl.
*B60N 2/64* (2006.01)
(52) U.S. Cl. ................................ 296/65.16; 297/378.13
(58) Field of Classification Search ............... 296/65.09, 296/65.16, 65.17; 297/378.13
See application file for complete search history.

(56) References Cited

U.S. PATENT DOCUMENTS

2008/0088167 A1   4/2008  Okazaki et al.
2008/0129017 A1*  6/2008  Okazaki et al. ............... 280/727

FOREIGN PATENT DOCUMENTS

JP  2003-312329 A   11/2003
JP  2008-94227        4/2008

* cited by examiner

*Primary Examiner* — Dennis Pedder
(74) *Attorney, Agent, or Firm* — J-TEK Law PLLC; Jeffrey D. Tekanic (57) ABSTRACT

A vehicle seat reclining device comprises a slider, which has an engaging portion and rotatable portions, and a rail having engagable portions. The engaging portion is retractable from the rail during a backrest tilting operation and advances towards the rail to lock the backrest in a selected tilted position. The engagable portions engage with the advanced engaging portion to prevent sliding of the slider relative to the rail. Clearances are provided between the rail and the slider in a width direction that is orthogonal to a rotational axis defined in the engaging portion. The width direction is also orthogonal to the central axial line of the rail. The rotatable portions project from the slider in a radial direction from the rotational axis and narrow the clearances so as to guide the rotation of the slider relative to the rail around the rotational axis.

20 Claims, 11 Drawing Sheets

PRIOR ART

VEHICLE SEAT RECLINING DEVICE

CROSS-REFERENCE TO RELATED APPLICATION

This application claims the priority benefit of Japanese Patent Application No. 2010-023580 filed on Feb. 4, 2010, the entire contents of which are incorporated by reference as if fully set forth herein.

TECHNICAL FIELD

The present teachings relate to a seat reclining device, preferably for use in a vehicle, and the manufacture and use thereof.

BACKGROUND

Japanese Patent Laid-Open Publication No. 2008-94227 and its counterpart U.S. Patent Publication No. 2008/0088167 disclose a vehicle seat reclining device that includes a portion affixed to the vehicle body, which cooperates with a lock member affixed to a tiltable seatback of a vehicle seat so as to permit the seatback to be selectively locked in a stepwise manner in a series of tilted positions. The vehicle seat reclining device comprises a rail, a slider and a lock apparatus.

The rail extends linearly along a central axial line and is affixed to the vehicle body so as to be tangential to a curved path traced in space by the lock member as the seatback tilts. The slider is slidably attached to the rail and pivotably supports a striker. The striker engages with the lock member on the seatback. The lock apparatus comprises two protruding portions that respectively engage in notch portions of the rail and lock holes of the slider so as to prevent the slider from sliding along the rail. The protruding portions can be retracted from the rail and the slider in order to permit the slider to slide along the rail.

Such a vehicle seat reclining device employs a linear or straight rail and a slider that slides along the straight rail. Therefore, manufacturing costs can be reduced as compared to a vehicle seat reclining device that employs a slider that slides along an arched or curved rail.

However, when the slider slides along a linear rail due to the seatback being tilted, the lock member traces or moves in space along an arched or curved path while the slider moves along a linear path, whereby a deviation between the two paths occurs. Therefore, the striker must pivot on the slider in order to absorb the deviation. This pivotability also reduces the effect of tolerance flaws that would make it difficult for the slider to slide along the rail when the seatback is tilted.

However, it is difficult to achieve a smooth tilting action of the seatback while simultaneously achieving a reduction in manufacturing costs with such a vehicle seat reclining device.

More particularly, the above-described vehicle seat reclining device is configured such that the striker is pivotably supported on the slider. It is therefore difficult to reduce manufacturing costs as compared to a more common configuration, in which the striker is fixedly attached to the slider. Moreover, since it is difficult to construct both a pivotable support and a fixed attachment between the striker and the slider, when the slider slides along the rail, rattling or other noises readily occur in the area around the pivot shaft of the striker and the slider. This makes it difficult to realize a smooth tilting of the seatback.

SUMMARY

Accordingly, in one aspect of the present teachings, a vehicle seat reclining device is provided that is capable of performing a smooth tilting of the backrest. In addition or in the alternative, the vehicle seat reclining device may also achieve manufacturing cost reductions.

In another aspect of the present teachings, a vehicle seat reclining device may be affixed to a lateral side or side wall of a vehicle body and preferably cooperates or operates together with a locking device that is affixed to a tiltable backrest of a vehicle seat in order to stepwise lock the backrest in a selected tilted position. The vehicle seat reclining device may generally comprise a rail, a slider and a latch mechanism.

The rail preferably extends linearly along a central axial line and may be affixed to the lateral side of the vehicle body so as to align, overlap or intersect with an arched or curved path that the locking device will trace in space as the backrest tilts. For example, the central axial line is preferably at least substantially tangential to the arched or curved movement path of the locking device. The slider may be slidably supported by the rail and preferably includes a fixedly attached striker that is configured to engage with the locking device attached to the backrest. The latch mechanism selectively prevents and permits sliding of the slider along the central axial line and preferably comprises at least one engaging portion and a plurality of engagable portions.

The at least one engaging portion is coupled to the slider, preferably movably or pivotably coupled. The at least one engaging portion is configured to be retracted or withdrawn from the rail when the backrest will be tilted to a new tilted position and to advance towards the rail at other times, i.e. when the backrest is not desired to be tilted. The engagable portions are provided at, on or in the rail and are preferably configured to engage the advanced engaging portion to prevent or inhibit sliding of the slider relative to the rail along the central axial line.

Clearances are preferably provided in a width direction between the rail and the slider. The width direction is orthogonal to a rotational axis that falls or is defined within the engaging portion when it is engaged with an engagable portion, and also is orthogonal to the central axial line. Rotatable portions project from respective edges of the slider in a radial direction away from the rotational axis and narrow the clearances so as to guide rotation of the slider relative to the rail around the rotational axis. That is, the rotatable portions preferably contact the rail in the width direction, so as to prevent a displacement of the slider in the width direction when the slider rotates or pivots relative to the rail during a backrest tilting operation.

The vehicle seat reclining device preferably employs a linearly extending or straight rail and a slider that slides along the straight rail, which is less expensive to manufacture as compared to a curved rail embodiment.

However, when the backrest is tilted and the slider slides along the straight rail, the locking device will trace an arched or curved path in space while the slider traces or moves along a linear path. Consequently, the paths of movement of the slider and the locking device will deviate as the backrest is tilted.

This potential problem is addressed by providing respective clearances in the width direction between the rail and the slider, which width direction was defined above, and by providing rotatable portions on the slider in accordance with the above noted configuration. Consequently, in this aspect of the present teachings, the striker affixed to the slider can also rotate or pivot about the rotational axis when the slider pivots, thereby absorbing the displacement or deviation between the movement paths of the locking device and the striker, which is fixedly attached to the slider. The rotatable portions narrow or eliminate the clearances in the width direction between the rail and the slider. This prevents a positional displacement of the slider in the width direction relative to the rail, thereby reducing or even eliminating rattling and noise generated as the slider slides along the rail, which has been a problem of known seat reclining devices. Moreover, since the striker is fixedly attached to the slider, it is possible to firmly or permanently attach the striker to the slider, which is an improvement over the above-described known seat reclining device, in which the striker is pivotably supported on the slider about the pivot shaft. Rattling and noise generation are thus unlikely to occur in the area of the striker and the slider as the slider slides along the rail. Consequently, this vehicle seat reclining device is capable of tilting the backrest more smoothly and quietly.

Further objects, features, advantages and aspects of the present teachings will become apparent after reading the following description and claims in view of the drawings.

DETAILED DESCRIPTION

An embodiment of the present invention will now be described with references to the drawings. In this respect, FIG. 1 should be viewed with the understanding that the right-hand side of the sheet is directed towards the front side of a vehicle while the left-hand side of the sheet is directed towards the rear side of the vehicle and that the near side of the sheet is directed towards the right-hand side of the vehicle while the far side of the sheet is directed towards the left-hand side of the vehicle. Each of the horizontal direction, the forward and rearward directions and the vertical direction as indicated in each of the subsequent drawings correspond to the respective directions shown in FIG. 1.

Figure 1:
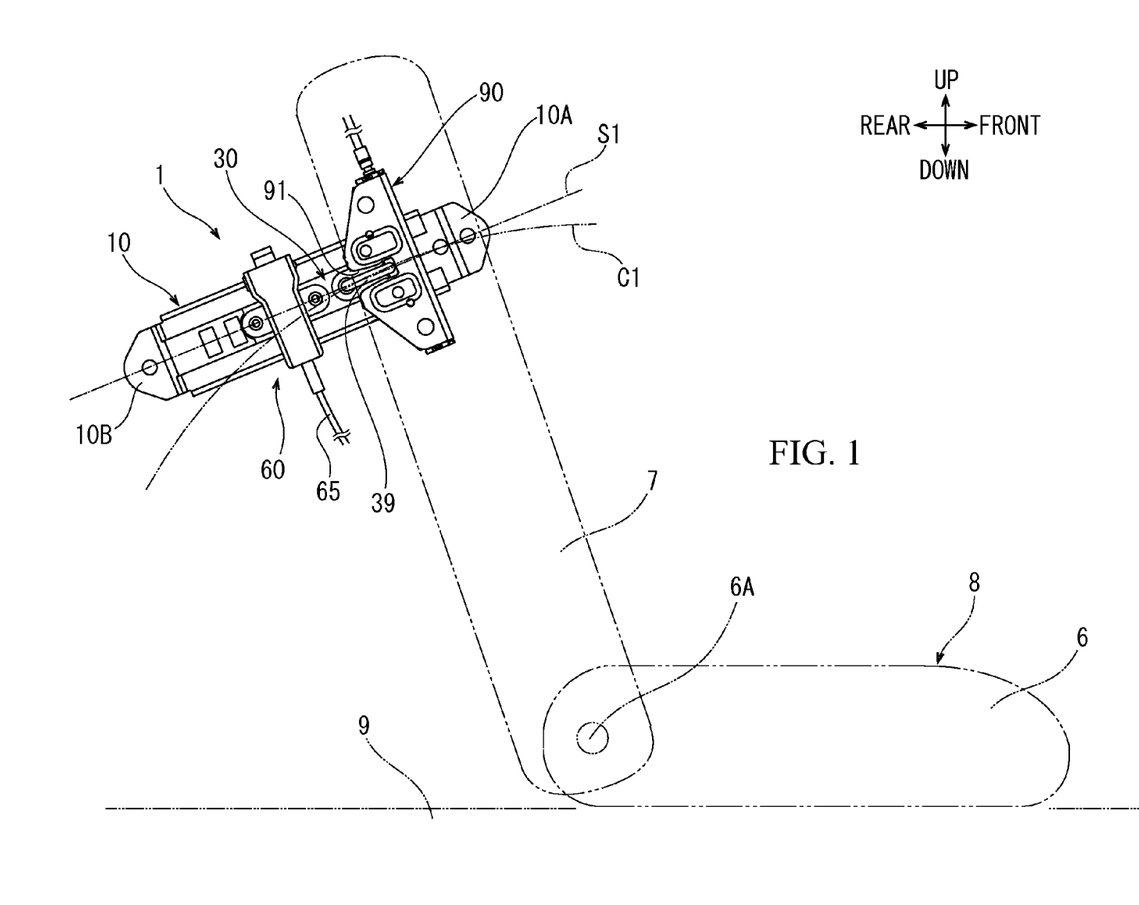
FIG. 1 is a schematic side view showing the relative positional relationships of a backrest, a locking device and a seat reclining device according to a vehicle seat reclining device of a representative embodiment of the present teachings.

As shown in FIG. 1, the representative vehicle seat reclining device 1 may be utilized with a vehicle seat 8 mounted on a floor of a vehicle body 9 together with a locking device 90 mounted on a lateral side of a vehicle seat backrest 7. The vehicle seat 8 comprises a seat main body 6, on which a passenger sits, and a backrest 7, against which the passenger leans. The backrest 7 is tiltably supported on a support shaft 6A provided at a rearward end portion of the seat main body 6 and rises up from the rearward end portion of the seat main body 6 in an oblique, rearward direction when in its normal operating position.

The locking device 90 is affixed to a generally upper portion of the left-side surface of the backrest 7, i.e. on the far side of the backrest 7 in FIG. 1, such that the backrest 7 is actually disposed between the viewer and the locking device 90. The locking device 90 may have a known configuration including a recessed opening 91 and a fork (not shown) that is displaceable to close the recessed opening 91. While a more detailed description will given below, it is noted here that, when the fork closes the recessed opening 91 with a striker 39 of the vehicle seat reclining device 1 inserted into the recessed opening 91, the locking device 90 engages with the striker 39 to fix the tilted position of the backrest 7. Further, the striker 39 is displaceable in a stepwise manner in the forward and rearward directions, which displacement is transmitted to the backrest 7 via the locking device 90 so as to change the tilted position of the backrest 7 in a stepwise manner. When the backrest 7 tilts, the locking device 90 traces a curved or arched path C1 in space and the center of the generally circular path C1 is the support shaft 6A.

While not shown in the drawings, a release lever for releasing the engagement between the locking device 90 and the striker 39 is provided in the vicinity of the vehicle seat 8. The release lever may be used, for instance, when the backrest 7 is to be folded forward in order to load a large piece of luggage behind the backrest 7. In this case, when the passenger operates the release lever, the locking device 90 will disengage from the striker 39, so that the backrest 7 can be folded (pivoted) forward about the support shaft 6A.

The vehicle seat reclining device 1 is provided on the left-hand side (on the far side of the locking device 90 in FIG. 1) of the locking device 90 and is attached to the lateral side of the vehicle body 9. The vehicle seat reclining device 1 comprises a rail 10, a slider 30 and a latch mechanism 60.

As shown in more detail in FIGS. 2 to 5, the rail 10 may be formed by bending a metallic steel plate to substantially have a "C" shape in cross-section and to linearly extend along a central axial line S1. As shown in FIG. 6 (a cross-section along line VI-VI in FIG. 5), an inner wall surface of the rail 10 that extends in parallel with the central axial line S1 serves as a first guide surface 11. Second guide surfaces 12A, 12B are defined by a pair of wall surfaces that each extend at a right angle from the respective end edges of the first guide surface 11 in the width direction (the horizontal direction in FIG. 6) and extend in parallel with the central axial line S1. Further, third guide surfaces 13A, 13B are defined by a pair of inward-facing wall surfaces that each extend from the respective end edges of the second guide surfaces 12A, 12B. The third guide surfaces 13A, 13B are spaced from the first guide surface 11 so as to extend in parallel with the first guide surface 11. If the rail 10 has such a cross-sectional shape, it is easy to increase the bend or flexural strength of the rail 10 while limiting or minimizing the height of the rail 10.

Figure 2:
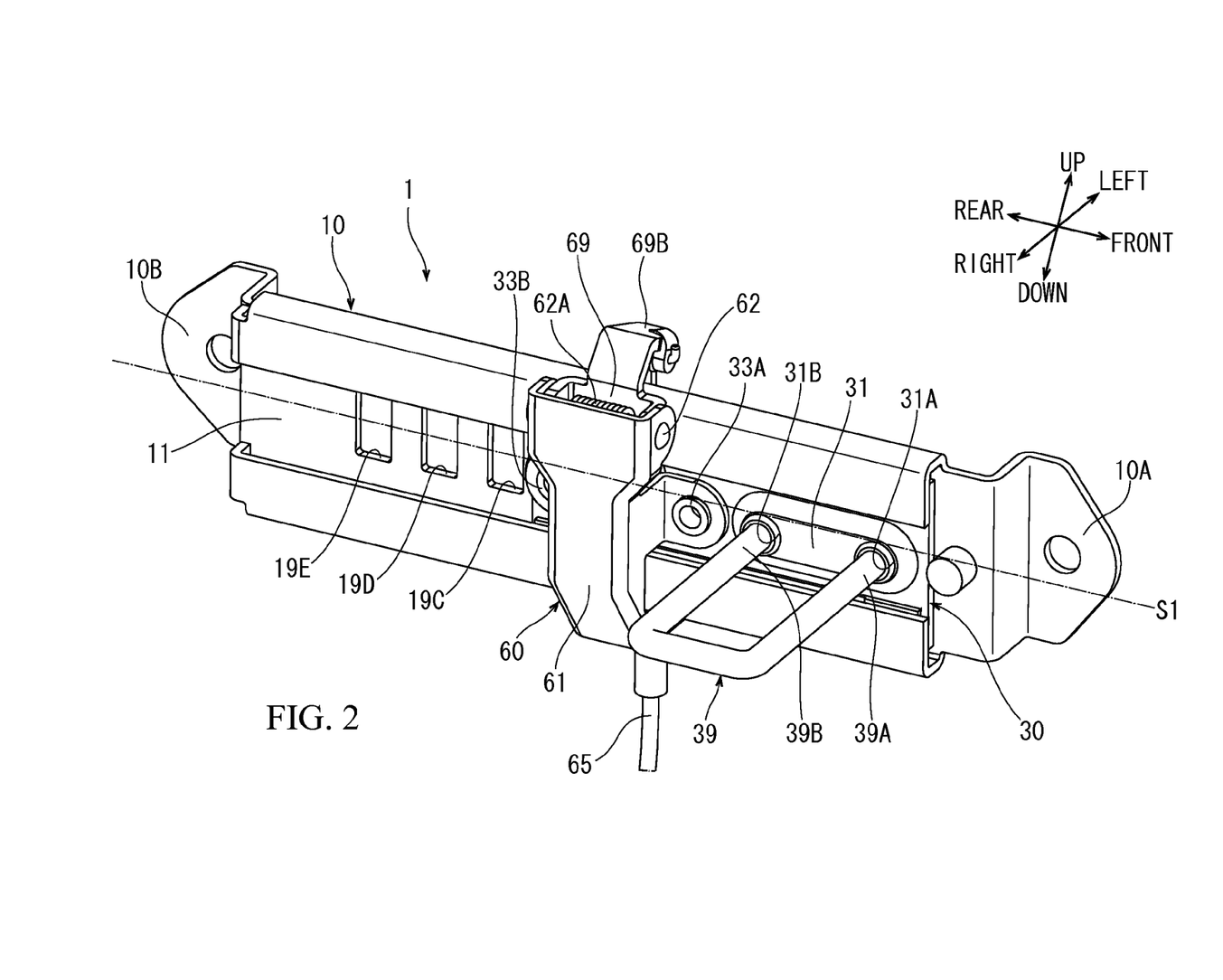
FIG. 2 is a perspective view of the vehicle seat reclining device according to the representative embodiment.
Figure 3:
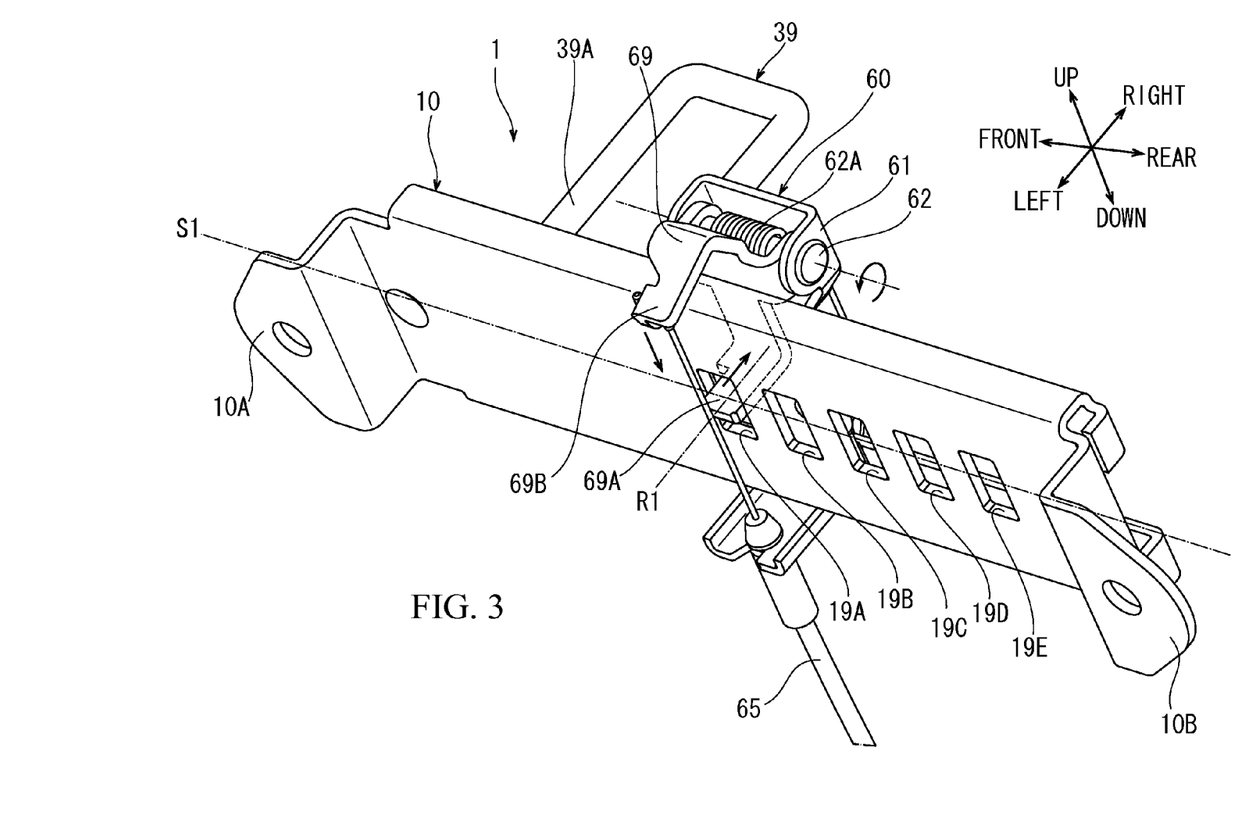
FIG. 3 is another perspective view of the vehicle seat reclining device according to the representative embodiment.

As shown in FIGS. 2 and 3, crank-like mounting portions 10A, 10B are formed on a forward end side and a rearward end side of the rail 10, respectively. The rail 10 is affixed to the vehicle body 9 by attaching these mounting portions 10A, 10B to the vehicle body 9 using fastening screws or the like. As shown in FIG. 1, the rail 10 is positioned on the vehicle body 9 such that the central axial line S1 of the rail 10 is at least substantially tangential to the arc C1 traced by the locking device 90 when the backrest 7 is tilted forward and rearward. That is, the central axial line S1 of the rail 10 preferably at least overlaps and/or intersects the arc C1 while being substantially parallel to or aligned with a tangent of the arc C1.

Figure 4:
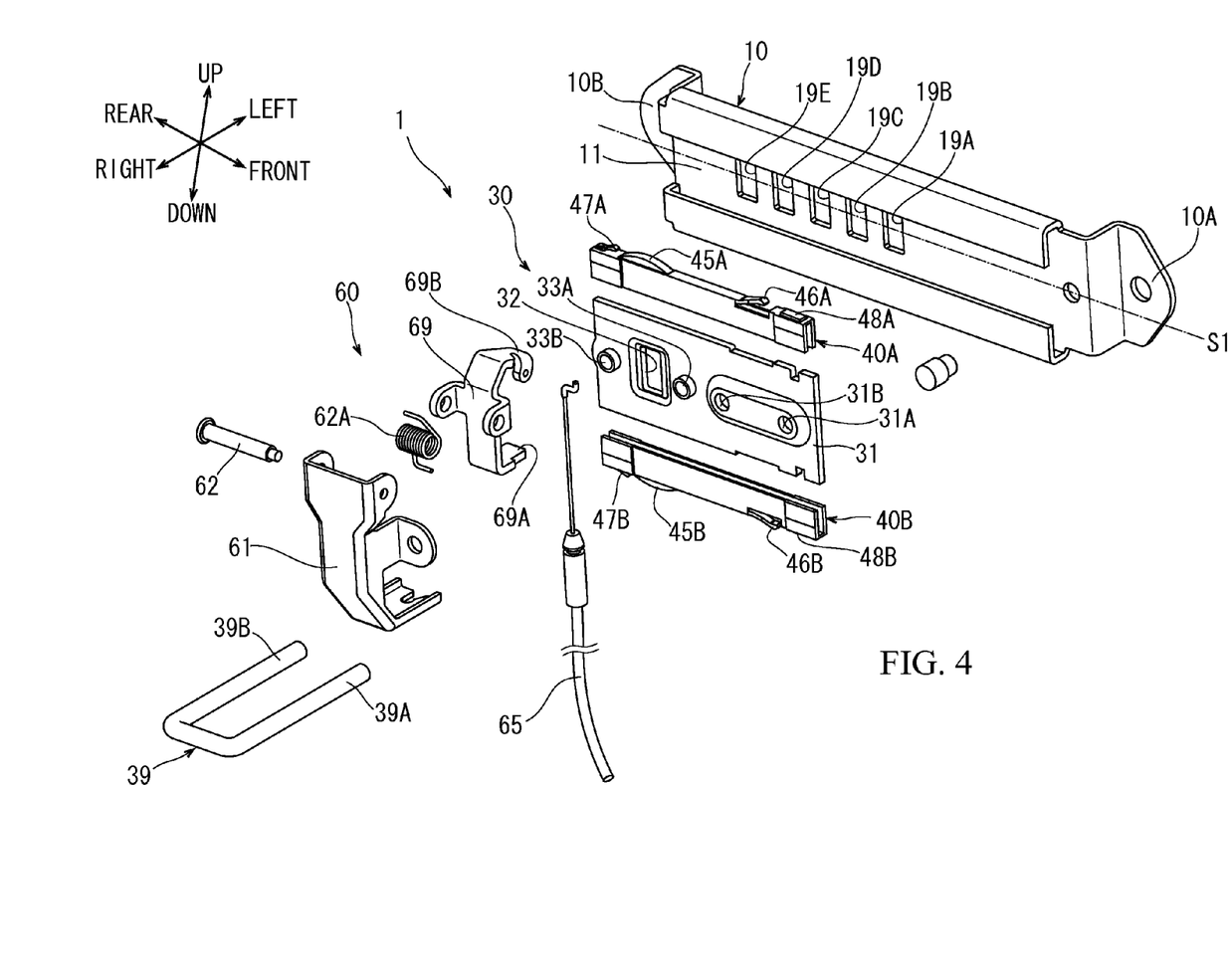
FIG. 4 is an exploded perspective view of the vehicle seat reclining device according to the representative embodiment.
Figure 5:
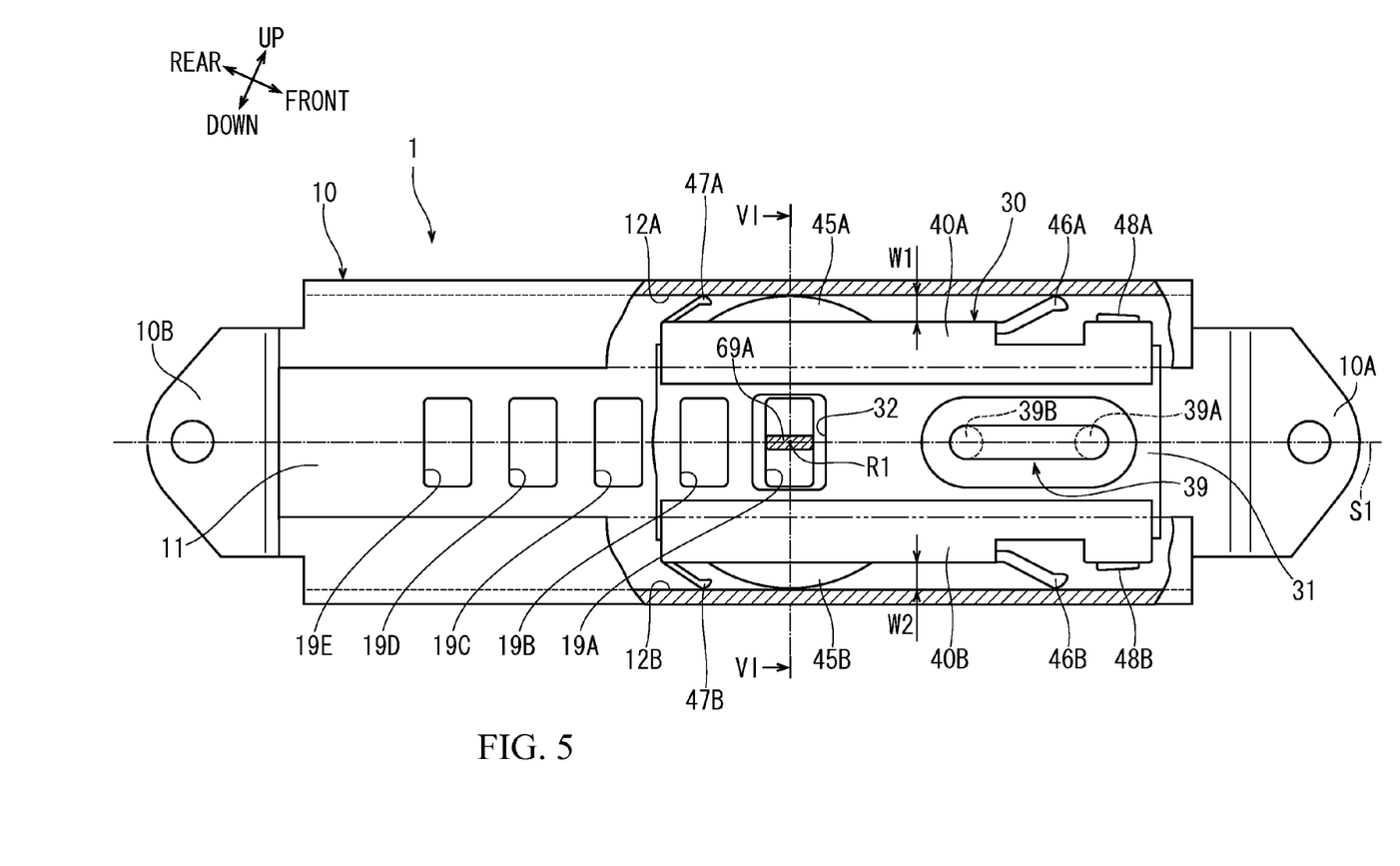
FIG. 5 is a side view (partial sectional view) for explaining the rotation or pivoting of the slider relative to the rail about a rotational axis (wherein the slider is its base position, i.e. not rotationally offset around the rotational axis) according to the representative embodiment.
Figure 6:
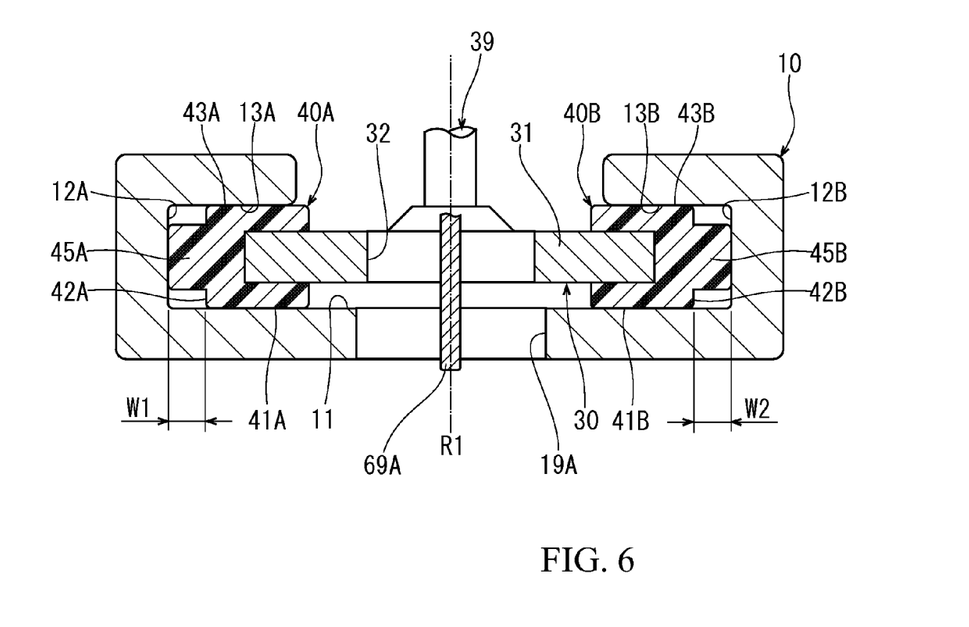
FIG. 6 is a sectional view showing the section along VI-VI in FIG. 5 according to the representative embodiment.

As shown in FIGS. 3 to 5, five latch holes (latch engaging devices) 19A, 19B, 19C, 19D and 19E penetrate through the first guide surface 11 of the rail 10 and extend along the central axial line S1. The latch holes 19A to 19E have a rectangular shape that is longer in the width direction of the first guide surface 11. As will be further described below with reference to FIG. 12, middle portions of a first side 191 and a second side 192 of each latch hole 19A-19E are closer to each other along the central axial line S1 than the end portions of the first and second sides 191, 192.

As shown in FIGS. 4 to 7, the slider 30 comprises a slider main body 31 and a pair of sliding layers (edges) 40A, 40B.

Referring to FIG. 4, the slider main body 31 may be formed by punch-pressing a metallic steel plate and has a rectangular shape that is longer in the direction of the central axial line S1. Two post holes 31A, 31B penetrate through a forward portion of the slider main body 31. On the other side, a rectangular opening 32 penetrates through a rearward portion of the slider main body 31. A pair of outwardly-projecting boss portions 33A, 33B are disposed on the forward and rearward sides of the opening 32, respectively.

As shown in FIG. 2, a striker 39 is affixed to the slider main body 31. Referring to FIG. 4, the striker 39 may be formed by bending a metallic round bar so as to have a substantially "U" shape. The striker 39 is fixedly connected to the slider main body 31 by inserting its front end portion 39A and rear end portion 39B through the respective post holes 31A, 31B and then welding or heat crimping. A portion of the front end portion 39A of the striker 39 is inserted into the above-mentioned recessed opening 91 of the locking device 90 in order to engage with the locking device 90.

Figure 7:
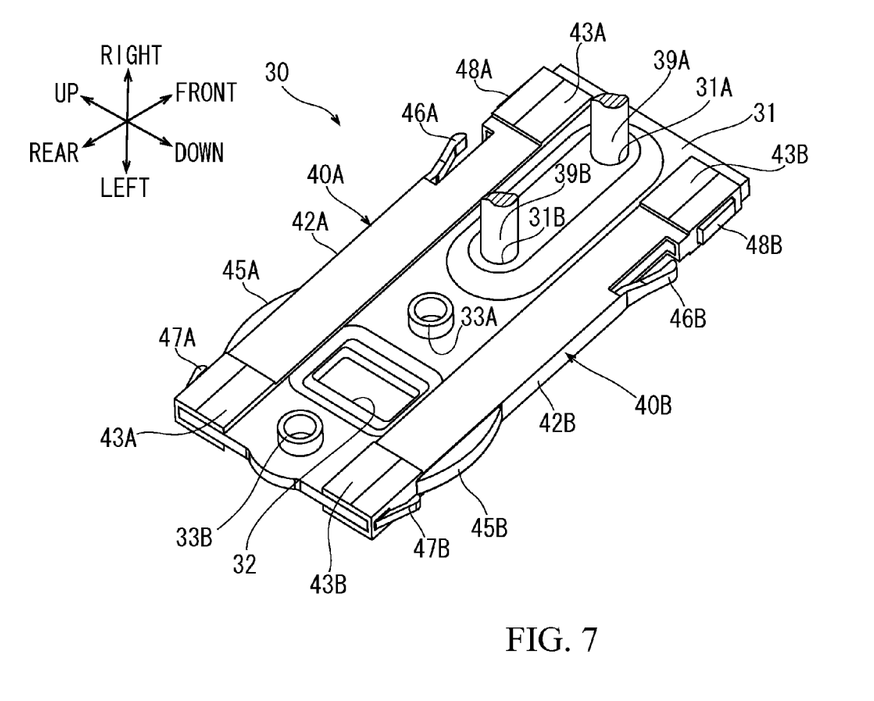
FIG. 7 is a perspective view of the slider according to the representative embodiment.

As shown in FIGS. 4, 6 and 7, the sliding layers 40A, 40B are resin members that respectively surround an upper edge and a lower edge of the slider main body 31 in a substantially "C" shape. After the striker 39 has been affixed to the slider main body 31, the respective sliding layers 40A, 40B are integrated with the slider main body 31 by setting the slider main body 31 into an injection molding die and then injection molding the layers or edges 40A, 40B using a thermoplastic resin. Suitable examples of a resin for forming the two sliding layers 40A, 40B include resin materials exhibiting excellent wear-resistance and/or excellent sliding properties (for instance, POM (polyacetal) resin, PA (polyamide, e.g., nylon) resin, etc.).

As shown in FIG. 6, the slider 30 is housed in the rail 10. In the following description, the surfaces of the respective sliding layers 40A, 40B that face the first guide surface 11 will be called "first guided surfaces" 41A, 41B, the pair of surfaces that face the respective second guide surfaces 12A, 12B will be called "second guided surfaces" 42A, 42B, and the pair of surfaces that face the respective third guide surfaces 13A, 13B will be called "third guided surfaces" 43A, 43B.

The first guided surfaces 41A, 41B and the third guided surfaces 43A, 43B are formed with high precision based on the inner cavity shape of the injection molding die. Consequently, the first guide surface 11 can slidably contact the first guided surfaces 41A, 41B without rattling, and the third guide surfaces 13A, 13B can also slidably contact the third guided surfaces 43A, 43B without rattling. On the other hand, clearances W1, W2 in the width direction (the horizontal direction in FIG. 6) are provided between the second guide surfaces 12A, 12B and the second guided surfaces 42A, 42B, respectively. It is noted that rotatable (rounded) portions 45A, 45B, which outwardly project from the respective second guided surfaces 42A, 42B in the width direction and rotatably or slidably contact the second guide surfaces 12A, 12B, respectively, will be further described below. The thus arranged slider 30 is slidable along the central axial line S1 of the rail 10. The striker 39 is movable with the slider 30 along the central axial line S1 such that it projects outwardly from the rail 10 from the portion of the slider main body 31 that is disposed between the third guide surfaces 13A, 13B.

As shown in FIGS. 2 and 4, a lever supporting member 61 is fixedly attached to the slider main body 31 and is configured to cover the opening 32. The lever supporting member 61 has flanges that laterally project from the side walls in the forward and rearward directions and are attached to the slider main body 31 by crimp fastening the boss portions 33A, 33B.

As shown in FIGS. 3 and 4, a lever 69 is supported on the lever supporting member 61 so as to be pivotable about a pivot shaft 62. The pivot shaft 62 extends in parallel with the central axial line S1. The lever 69 may be formed by punch pressing a metallic sheet plate, and includes a latch claw 69A and an input portion 69B. The latch claw 69A extends downward from the pivot shaft 62 and bends to the left. The input portion 69B extends upwards from the pivot shaft 62 and also bends to the left.

A torsion coil spring 62A is fitted around the pivot shaft 62 and biases the lever 69 such that the latch claw 69A is urged towards the first guide surface 11 of the rail 10. This configuration enables the claw 69A to advance into the interior of the hole, thereby engaging the claw 69A in the hole, when the latch claw 69A is positioned so as to face or oppose any one of the latch holes 19A to 19E of the rail 10. In this engaged state, the slider 30 is prevented from sliding relative to the rail 10 along the central axial line S1. This structural configuration enables the distance between facing surfaces of the first guide surface 11 of the rail 10 and the slider main body 31 to be shorted or reduced. Therefore, the load applied to the latch claw 69A or the lever 69 can be reduced in such a vehicle seat reclining device 1.

One end of a transmission cable 65 is connected to the input portion 69B. While not shown in the drawings, an adjusting lever for adjusting the tilted position of the backrest 7 is provided in the vicinity of the vehicle seat 8, and the other end of the transmission cable 65 is connected to the adjusting lever. When the passenger operates the adjusting lever in order to adjust the tilted position of the backrest 7, the movement of the adjusting lever is transmitted to the input portion 69B via the transmission cable 65. Therefore, the input portion 69B will be pulled downward as shown in FIG. 3. This will cause the lever 69 to pivot about the pivot shaft 62 against the biasing force of the torsion coil spring 62A and cause the latch claw 69A to retract or move away from the first guide surface 11 of the rail 10. Thus, the latch claw 69A will disengage from the respective latch hole 19A to 19E and the slider 30 will be permitted to slide relative to the rail 10 along the central axial line S1.

Figure 8:
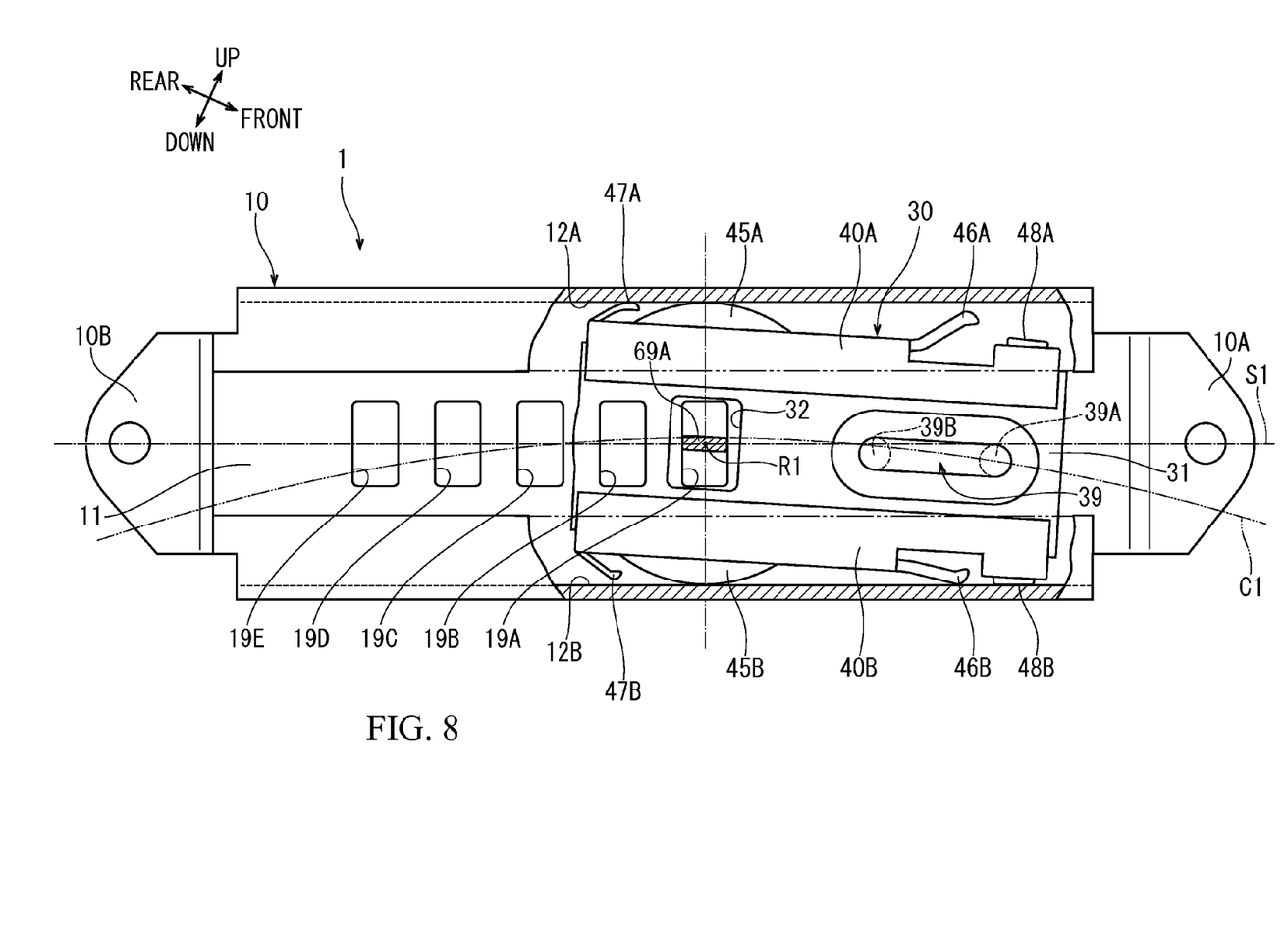
FIG. 8 is a side view (partial sectional view) for explaining the rotation of the slider relative to the rail around a rotational axis (wherein the slider is rotationally offset from its base position) according to the representative embodiment.

In FIGS. 5 and 8, the latch claw 69A is engaged in the latch hole 19A and the striker 39 is disposed at its forward-most position. While not shown in the drawings, when the latch claw 69A is positioned to permit engagement with the latch hole 19E, the striker 39 will be disposed at its rearward-most position.

In a preferred aspect of the present teachings, the latch mechanism 60 may comprise one lever 69 having one latch claw 69A (e.g., a representative example of an "engaging portion") and five latch holes 19A to 19E (e.g., representative examples of an "engagable portion"). As will be further discussed in the following, a rotational axis R1 may be defined or fall within in a central portion of the latch claw 69A when the latch claw 69A is engaged with any one of the latch holes 19A to 19E as shown in FIGS. 3, 5, 6 and 8.

As shown in FIGS. 5 to 8, a pair of rotatable (rounded) portions 45A, 45B respectively project radially relative to the rotational axis R1 and are integrally formed with the respective sliding layers 40A, 40B. The rotatable portions 45A, 45B form a portion of an overall cylindrical-shaped surface whose center is the rotational axis R1 and whose radius equals the distance between the rotational axis R1 and the respective second guide surfaces 12A, 12B (i.e. one half of the distance between the two second guide surfaces 12A, 12B). Accordingly, the rotatable portions 45A, 45B narrow or even eliminate the clearances W1, W2 between the respective second guide surfaces 12A, 12B and the respective guided surfaces 42A, 42B. Preferably, when the slider 30 pivots about the rotational axis R1 away from a base or original rotational position where a longitudinal axis of the slider 30 is aligned with the central axial line S1 (i.e. the position shown in FIG. 5), the respective rotatable portions 45A, 45B will be constantly in sliding contact with the second guide surfaces 12A, 12B. As a result, the slider 30 will pivot about the rotational axis R1 without any positional displacement of the slider 30 relative to the rail 10 in the width direction.

A pair of stopper portions 48A, 48B project outwardly from the forward end portion of the respective sliding layers 40A, 40B and face the respective second guide surfaces 12A, 12B. The pivotable range of the slider 30 about the rotational axis R1 is limited by the stopper portion 48A abutting the second guide surface 12A on the one side and the stopper portion 48B abutting the second guide surface 12B on the other side (the state shown in FIG. 8).

A pair of biasing (spring) portions 46A, 46B are integrally formed on the sliding layers 40A, 40B, respectively, between the rotatable portions 45A, 45B and the stopper portions 48A, 48B. A pair of biasing (spring) portions 47A, 47B are also integrally formed on the rearward end portion of the sliding layers 40A, 40B, respectively. The respective biasing portions 46A, 46B, 47A, 47B project outwardly and obliquely from the respective sliding layers 40A, 40B in the width direction. In the state shown in FIG. 5, each biasing portion 46A, 46B, 47A, 47B is in sliding contact with the respective second guide surface 12A, 12B across the respective clearances W1, W2 in the width direction and each biasing portion 46A, 46B, 47A, 47B is elastically deformed.

When the forward end portion 39A of the striker 39 is not in engagement with the locking device 90, the slider 30 is not rotationally offset around the rotational axis R1, i.e. it is in its base or original rotational position. Further, the striker 39 is positioned so as to be aligned with the central axial line S1 as shown in FIG. 5.

On the other hand, as shown in FIG. 8, when the forward end portion 39A of the striker 39 is engaged with the locking device 90 such that the central axial line S1 is disposed above the arc or curved path C1 at the axial position of the forward end portion 39A, a moment or torque has caused the striker 39 to pivot clockwise about the rotational axis R1, thereby also causing the slider 30 to pivot about the rotational axis R1. As a result, the displacement or deviation between the arc or curved path C1 and the central axial line S1 has been absorbed. At this time, the biasing portion 46B is firmly pressed against the second guide surface 12B and is thus further elastically deformed. The biasing portion 47A is also firmly pressed against the second guide surface 12A and is thus further elastically deformed. As a result, a restoring force generated by the biasing portions 46B, 47A will act on the slider 30 to urge the slider 30 to return to its base or original rotational position by pivoting back about the rotational axis R1. Therefore, the slider 30 can easily return to its base rotational position relative to the rotational axis R1 in cases in which the forward end portion 39A of the striker 39 is not engaged with the locking device 90 or the slider 30 is moved rearward.

Though not shown in the drawings, when the slider 30 pivots about the rotational axis R1 relative to the rail 10 in a direction opposite to the above direction (e.g., counterclockwise), the biasing portions 46A, 47B will urge the slider 30 to return to its original position by pivoting back about the rotational axis R1.

Since the vehicle seat reclining device 1 of this embodiment employs a linearly extending (straight) rail 10 and a slider 30 that slides along the straight rail 10, it is possible to reduce manufacturing costs as compared to an embodiment that employs an curved or arched rail and a slider that slides along the curved or arched rail.

However, when the slider 30 slides along the straight rail 10 due to the backrest 7 being tilted, the locking device 90 will trace an arched or curved path C1 while the slider 30 traces a linear path along the central axial line S1. This causes a displacement or deviation between the two paths.

In view of this point, the clearances W1, W2 in the width direction, which is orthogonal to the rotational axis R1 and is also orthogonal to the central axial line S1, are provided between the rail 10 and the slider 30 in the present vehicle seat reclining device 1. The slider 30 further includes the pair of rotatable portions 45A, 45B. These rotatable portions 45A, 45B eliminate the clearances W1, W2 in the width direction and guide the rotation of the slider 30 relative to the rail 10 around the rotational axis R1 by maintaining sliding contact with the lateral edges of the rail 10. Since the striker 39 is affixed to the slider 30 and can also rotate around the rotational axis R1, it is possible to absorb the displacement or deviation between the respective paths of movement of the locking device 90 and the striker 39. Further, since the rotatable portions 45A, 45B eliminate the respective clearances W1, W2 between the rail 10 and the slider 30 in the width direction, there will be no positional displacement of the slider 30 relative to the rail 10 in the width direction. Therefore, this structural configuration can further reduce or even eliminate rattling and/or noise generation as the slider 30 slides along the rail 10. Moreover, since the striker 39 is affixed to the slider 30, it is easier to firmly attach the striker 39 to the slider 30 as compared to the above-described known art, in which the striker is pivotably supported on the slider. Accordingly, rattling or noise generation rarely occur in the area of the striker 39 or the slider 30 as the slider 30 slides along the rail 10. As a result, the backrest 7 can be smoothly and noiselessly tilted using such a vehicle seat reclining device 1.

Figure 10:
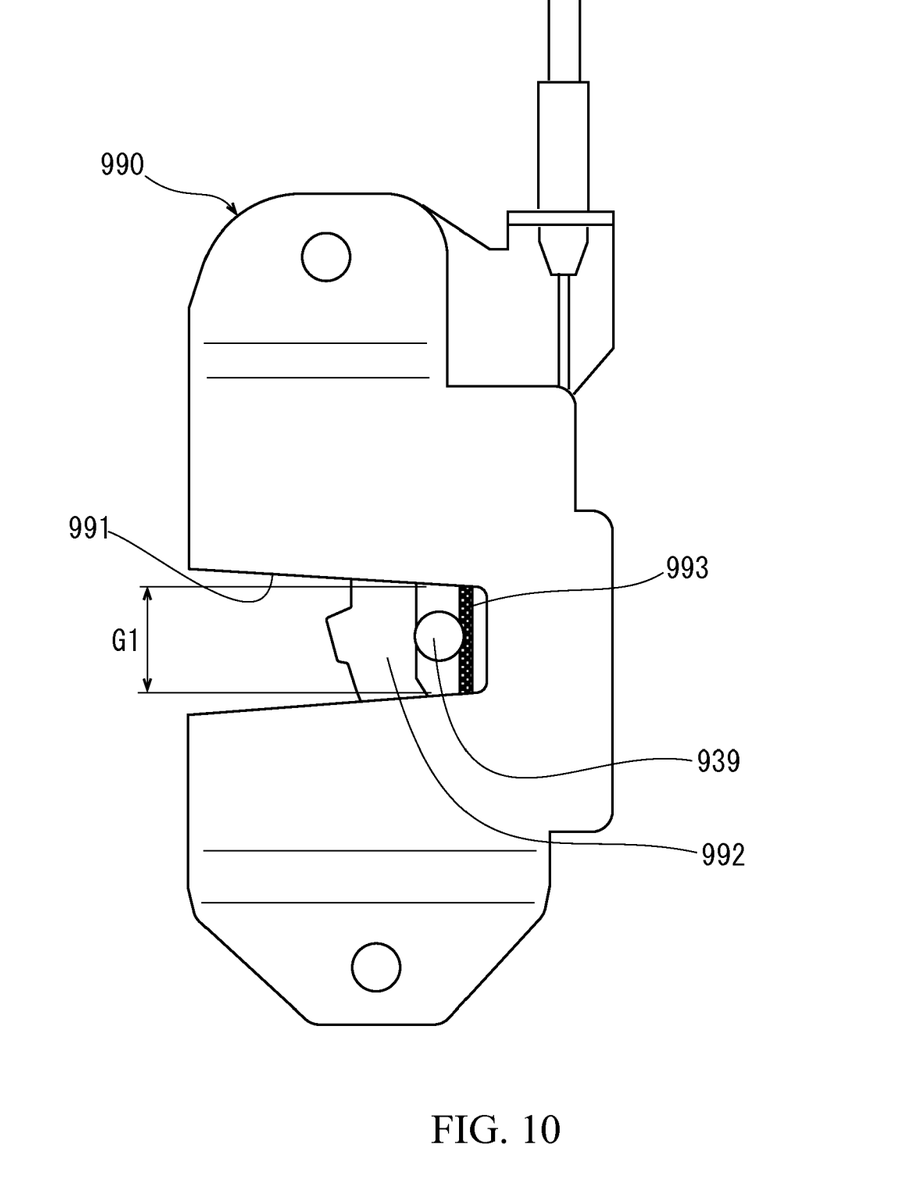
FIG. 10 is a schematic view for explaining a known locking device.

In addition or in the alternative, the present vehicle seat reclining device 1 can also realize manufacturing cost reductions. Moreover, the mouth of the recessed opening 91 of the locking device 90, which engages with the striker 39 of the vehicle seat reclining device 1 according to this embodiment (see FIG. 1), can be made narrower than the mouth G1 of a recessed opening 991 of a conventional locking device 990 as shown in FIG. 10. In the conventional locking device 990, a fork 992 and a damper 993 made of rubber or an elastomer are also relatively long in order to correspond to the relatively wide mouth G1, so that meshing positions of the fork 992 and the damper 993 relative to a striker 939 will vary. This will cause variations in the meshing strength between the locking device 990 and the striker 939, so that it will be difficult to increase the meshing strength. Moreover, since the striker 939 moves between the fork 992 and the damper 993 with the striker 939 biting or digging into the damper 993, a smooth tilting of the backrest tends to be inhibited. In contrast, the present locking device 90, which is engaged with the striker 39 of the vehicle seat reclining device 1 according to the present embodiment, enables the fork and the damper to be shortened, so that the meshing positions of the fork and the damper relative to the striker 39 barely vary. Accordingly, the meshing strength between the locking device 90 and the striker 39 will barely vary, and it becomes easy to increase the meshing strength. Further, since the striker 39 will not move between the fork and the damper while the striker 39 is biting or digging into the damper when reclining the backrest, a smooth tilting of the backrest 7 is not prevented.

Moreover, the biasing portions 46A, 46B, 47A and 47B of the present vehicle seat reclining device 1 can restrict the slider 30 from abruptly pivoting relative to the rail 10 about the rotational axis R1. This makes it possible to further reduce rattling and noise generation when the slider 30 slides along the rail 10. The biasing portions 46A, 46B, 47A and 47B urge the slider 30 to return to its original position after it has been pivoted. The striker 39 will thus reliably return to its original position even if it has deviated from the central axial line S1. Therefore, even if the striker 39 has been repeatedly engaged with and disengaged from the locking device 90, it is still possible to achieve a stable and reliable engagement of the two devices.

Further, the vehicle seat reclining device 1 comprises the metallic slider main body 31, which exhibits suitable strength for fixedly supporting the striker 39, and the resin sliding layers 40A, 40B, which exhibit long-term wear-resistance and excellent sliding properties for sliding along the rail 10. This structural configuration can thus realize manufacturing cost reductions, improvements in wear-resistance and the prevention or elimination of loud rattling noises caused by metallic parts hitting against each other due to undesirable play therebetween.

Figure 9:
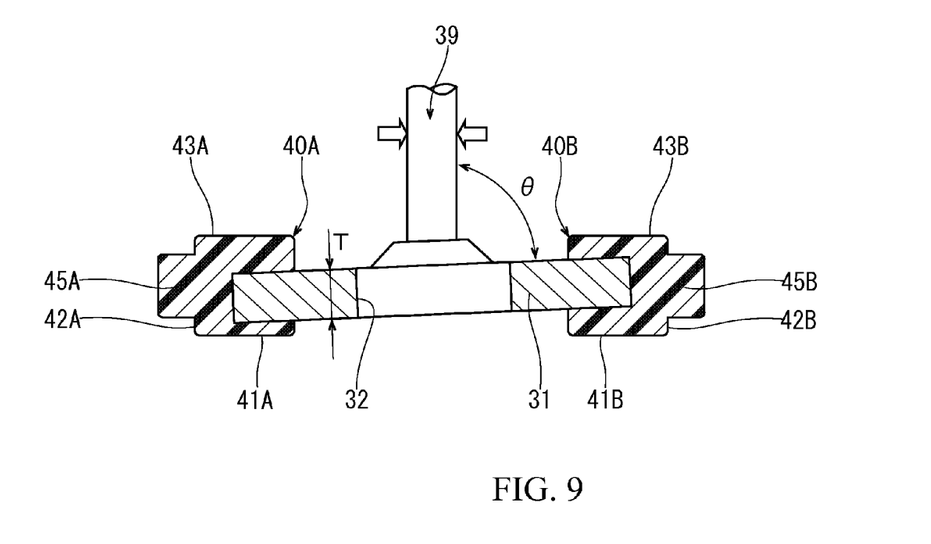
FIG. 9 is a sectional view for explaining a process for injection molding the sliding layers onto a main body of the slider, to which main body the striker is fixed, according to the representative embodiment.

As demonstrated by the vehicle seat reclining device 1 shown in FIG. 9, even if the mounting angle θ of the striker 39 relative to the slider main body 31 varies from an ideal angle or even if the plate thickness T of the slider main body 31 varies from an ideal thickness, the striker 39 can still be accurately positioned with respect to the cavity when the slider main body 31 (having the striker 39 affixed thereto) is set to the injection molding die, thereby enabling the respective sliding layers 40A, 40B, which are formed by injection molding, to absorb such variations. As a result, it is further possible to maintain high manufacturing quality while realizing manufacturing cost reductions.

Further reductions in manufacturing costs can be achieved by integrally forming the biasing portions 46A, 46B, 47A and 47B with the sliding layers 40A, 40B.

In the present vehicle seat reclining device 1, when the slider 30 is in its original or base rotational position (i.e. it is not rotated relative to the rail 10 around the rotational axis R1), the striker 39 is located on or aligned with the central axial line S1. The engaging position between the locking device 90 and the striker 39 and the engaging position between the latch claw 69A and the latch holes 19A to 19E can be located more easily on the central axial line S1. This reduces the moment that could cause the slider 30 to rotate relative to the rail 10 around the rotational axis R1. Consequently, the load acting on the rotatable portions 45A, 45B of the slider 30 can be reduced, which will thereby improve durability.

In the vehicle seat reclining device 1 shown in FIG. 5, etc., the rail 10, the slider 30 and the striker 39 are configured or designed to be line or mirror symmetric with respect to the central axial line S1 serving as the reference line. Accordingly, in this vehicle seat reclining device 1, the rail 10, the slider 30 and the striker 30 can be commonly used for both the left-hand side and the right-hand side of the vehicle body 9. This enables further manufacturing cost reductions.

Figure 11:
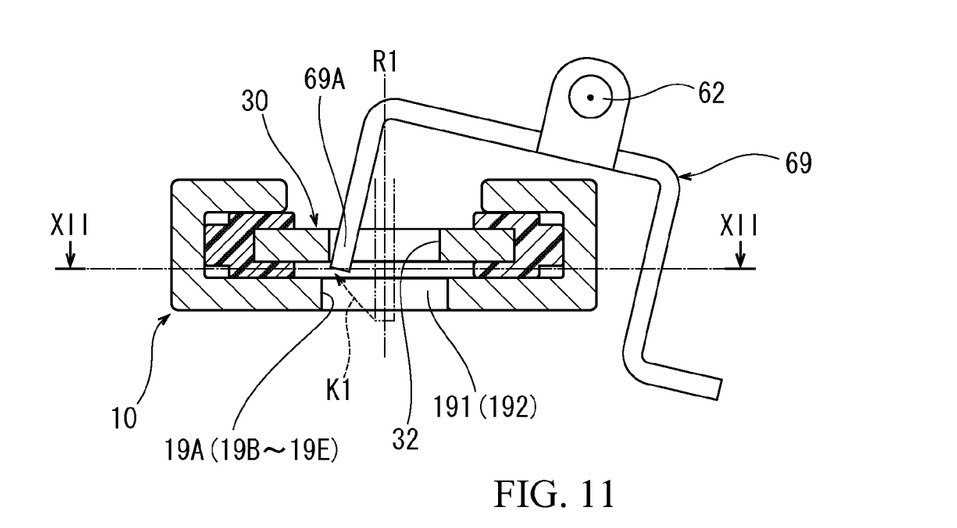
FIG. 11 is a sectional view showing a path of movement when a latch claw retracts from the rail according to the representative embodiment.

Furthermore, in the vehicle seat reclining device 1, the pivot shaft 62 is parallel to the central axial line S1 as shown in FIGS. 3 and 11. As is further shown in FIG. 12, each of the latch holes 19A to 19E has a first side 191 and a second side 192. The first side 191 is orthogonal to the central axial line S1 and extends in the directions away from the central axial line S1. The second side 192 is also orthogonal to the central axial line S1 and faces or opposes the first side 191. A clearance P1 between the first side 191 and the second side 192 along the central axial line S1 is preferably selected such that it provides a very small or no clearance relative to the length of the latch claw 69A in the direction of the central axial line S1 (i.e. the clearance P1 is at most slightly greater than the width of the latch claw 69A). Therefore, when the latch claw 69A engages in a particular latch hole 19A to 19E, the first side 191 and the second side 192 pinch or bound the latch claw 69A therebetween along the central axial line S1. The clearance between the first side 191 and the second side 192 preferably gradually increases above and below the central axis line S1 to wider clearance P2, i.e. in the direction that the latch claw 69A moves away from the central axial line S1 along the path K1 that is traced when the latch claw 69A is retracted or disengaged from the rail 10 (clearance P2>clearance P1). In this respect, while the difference between the sizes of clearance P2 and clearance P1 is illustrated in an exaggerated manner in FIG. 12 (i.e. not to scale), an actual difference of about several tenths of a millimeter to 2 mm will usually be sufficient).

Figure 12:
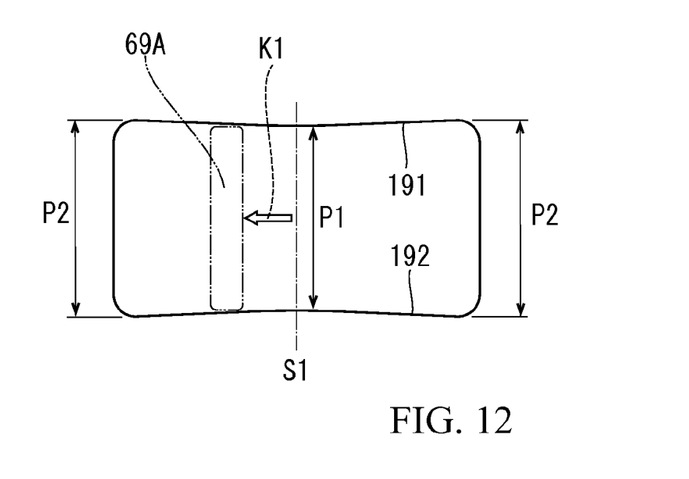
FIG. 12 is a top or plan view for explaining a preferred shape of latch holes and the relative positional relationships of the latch claw and the latch holes (showing a section along XII-XII of FIG. 1) according to the representative embodiment.

According to the above structural configuration, the latch claw 69A moves towards and away from the central axial line S1 while being pinched or bounded between the first side 191 and the second side 192 when the lever 69 pivots about the pivot shaft 62 that is parallel to the central axial line S1, whereby the latch claw 69A engages with or disengages from the respective latch holes 19A to 19E as shown in FIG. 11 and FIG. 12. If the clearance P1 between the first side 191 and the second side 192 along the central axial line S1 has been set in the above-described manner, when the latch claw 69A is disposed on the central axial line S1 and is thus in the engaged state, this configuration will prevent play and rattling between the latch claw 69A and the respective latch holes 19A to 19E. Consequently, the slider 30 can be reliably and stably fixed to the rail 10 in the engaged state. On the other hand, when the latch claw 69A is positioned so as to be spaced from the central axial line S1, it is possible to utilize a larger clearance between the first side 191 and the second side 192 with respect to the latch claw 69A. In this case, the latch claw 69A can smoothly advance into and retract from the latch holes 19A to 19E. As a result, the reclining operation will have a lighter feel, i.e. it will require less exertion by the person operating the seat adjusting lever. As is further shown in FIG. 12, since the latch holes 19A to 19E have a shape that is line or mirror symmetric with respect to the central axial line S1 serving as a reference, the rails 10 can be commonly used for both the left-hand side and the right-hand side of the vehicle body 9.

While the present invention has been described with reference to one presently preferred embodiment thereof, the present invention is not to be limited to the above-described embodiment, and can also be suitably modified without departing from the spirit of the invention. For example, instead of providing the sliding layers 40A, 40B on the slider main body 31 by injection molding, it is also possible to separately form the sliding layers and then fit and affix the sliding layers to the slider main body 31. This will reduce costs related to the dies as compared to injection molding.

Further, the striker may have either an "I" shape or the "U" shape. It is further possible to omit, for instance, one set of biasing portions 47A, 47B or biasing portions 46B, 47B from among the biasing portions 46B, 46B, 47A and 47B.

It is preferable that the surface of each rotatable portion forms or defines a portion of a cylindrical-shaped surface having the rotational axis as its center. The biasing portions may be provided on the slider main body or on the sliding layers. The latch holes and latch claw could have various different cross-sectional shapes. The cross-sectional shapes may be, e.g., circular, oval or rectangular. If the latch claw is not circular, the axis of the latch claw is preferably a straight line that passes through the center of gravity of the cross-sectional shape.

The present invention is applicable to tiltable seats in general, and more preferably tiltable vehicle seats.

A representative, non-limiting example of the present invention was described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seat reclining devices and methods for manufacturing and operating the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A vehicle seat reclining device configured to be attached to a vehicle body and to cooperate with a locking device affixed to a tiltable backrest of a vehicle seat, the vehicle seat reclining device comprising:
    a rail linearly extending along a central axial line, the rail being affixable to the vehicle body so as to be at least substantially tangent to an arched path traced in space by the locking device as the backrest tilts;
    a slider slidably supported on the rail;
    a striker immovably affixed to the slider and configured to engage with the locking device; and
    a latch mechanism configured to selectively permit or prevent sliding of the slider along the central axial line relative to the rail, the latch mechanism including:
        at least one engaging portion coupled to the slider and configured to be retracted from the rail during a tilting operation and to advance toward the rail to lock the backrest in a tilted position, and
        a plurality of engagable portions provided on the rail and configured to engage with the advanced engaging portion to prevent the slider from sliding relative to the rail along the central axial line,
    wherein clearances are provided between the rail and each side of the slider in a width direction, the width direction being orthogonal to a rotational axis serving as an axis of the engaging portion when it is in engagement with the engagable portion and also being orthogonal to the central axial line, and
    rotatable portions project from each side of the slider in the width direction and at least narrow the clearances so as to guide rotation of the slider relative to the rail around the rotational axis.

2. The vehicle seat reclining device according to claim 1, wherein the slider further comprises biasing portions disposed adjacent to the rotatable portions, the biasing portions being configured to be normally in sliding contact with the rail with the clearances therebetween and while being elastically deformed.

3. The vehicle seat reclining device according to claim 1, wherein the slider comprises a slider main body made of metal, to which the striker is affixed, and resin sliding layers fixedly attached to the slider main body so to be in sliding contact with the rail, the rotatable portions being formed on the sliding layers.

4. The vehicle seat reclining device according to claim 3, wherein biasing portions are formed on the sliding layers.

5. The vehicle seat reclining device according to claim 1, wherein the striker is configured so as to be at least substantially aligned with the central axial line when the slider is in its base rotational position such that the slider is not rotationally offset around the rotational axis relative to the rail.

6. The vehicle seat reclining device according to claim 5, wherein the rail, the slider and the striker are each configured to be line symmetric relative to the central axial line.

7. The vehicle seat reclining device according to claim 1, wherein:
    the rail includes:
        a first guide surface extending in parallel with the central axial line,
        a pair of second guide surfaces respectively extending at a right angle from respective end edges of the first guide surface in the width direction and extending in parallel with the central axial line, and
        a pair of third guide surfaces respectively extending from end edges of the second guide surfaces, the third guide surfaces being spaced from and parallel to the first guide surface in the width direction, the slider includes:
- a first guided surface facing the first guide surface,
- a pair of second guided surfaces facing the respective second guide surfaces, and
- a pair of third guided surfaces facing the respective third guide surfaces, and the rotatable portions project from the respective second guided surfaces towards the respective second guide surfaces.

8. The vehicle seat reclining device according to claim 7, wherein the striker outwardly projects from the rail between the pair of third guide surfaces.

9. The vehicle seat reclining device according to claim 1, wherein the latch mechanism further includes:
- a lever supported on the slider so to be pivotable about a pivot shaft, wherein a latch claw is disposed on a tip end of the lever and serves as the engaging portion, and
- a plurality of latch holes serving as the engagable portions, the latch holes being aligned and formed on the rail such that each of the latch holes is engageable with the latch claw.

10. The vehicle seat reclining device according to claim 9, wherein:
- the pivot shaft is substantially parallel with the central axial line,
- the latch holes each include a first side that is orthogonal to the central axial line and extends in directions away from the central axial line and a second side that is orthogonal to the central axial line and faces the first side, the first side and the second side bounding the latch claw therebetween along the central axial line when the latch claim is engaged in the respective latch hole, and
- a clearance between the first side and the second side widens in directions moving away from the central axis line.

11. The vehicle seat reclining device according to claim 10, wherein the slider further comprises:
- biasing portions disposed adjacent to the rotatable portions, the biasing portions being configured to be normally in sliding contact with the rail with the clearances therebetween and while being elastically deformed,
- a slider main body made of metal, to which the striker is affixed, and
- resin sliding layers fixedly attached to the slider main body so to be in sliding contact with the rail, the rotatable portions and the biasing portions being formed on the sliding layers.

12. The vehicle seat reclining device according to claim 11, wherein:
- the striker is configured so as to be at least substantially aligned with the central axial line when the slider is not rotationally offset around the rotational axis relative to the rail in its base rotational position, and
- the rail, the slider and the striker are each configured to be line symmetric relative to the central axial line.

13. The vehicle seat reclining device according to claim 12, wherein:
- the rail includes:
  - a first guide surface extending in parallel with the central axial line,
  - a pair of second guide surfaces respectively extending at a right angle from respective end edges of the first guide surface in the width direction and extending in parallel with the central axial line, and
  - a pair of third guide surfaces respectively extending from end edges of the second guide surfaces, the third guide surfaces being spaced from and parallel to the first guide surface in the width direction, the slider includes:
- a first guided surface facing the first guide surface,
- a pair of second guided surfaces facing the respective second guide surfaces, and
- a pair of third guided surfaces facing the respective third guide surfaces, the rotatable portions project from the respective second guided surfaces towards the respective second guide surfaces, and the striker outwardly projects from the rail between the pair of third guide surfaces.

14. An apparatus comprising:
- a linear rail defining a plurality of discrete lockable positions disposed along a central axial line thereof, each lockable position comprising a latch engaging device, the linear rail being configured to be fixedly attached to a lateral side of a vehicle body,
- a slider supported on the rail so as to be selectively slidable along the central axial line and to be pivotable about a rotational axis that is perpendicular to the central axial line, wherein a width direction of the slider and the rail is perpendicular to the central axial line and to the rotational axis,
- a striker immovably attached to the slider at a position spaced from the rotational axis of the slider and configured to be engaged by a locking device affixed to a vehicle seatback, and
- at least one latch movably coupled to the slider so as to be selectively engageable with the respective latch engaging devices, wherein engagement of the at least one latch with at least one latch engaging device prevents the slider from sliding along the central axial line,
- wherein a rounded portion is provided on a portion of each lateral side of the slider in the width direction, the rounded portions slidably contacting corresponding lateral sides of the linear rail in the width direction and being configured to guide pivotal movement of the slider within the rail about the rotational axis.

15. The apparatus according to claim 14, further comprising at least one spring normally urging the slider towards a base rotational position relative to the rail.

16. The apparatus according to claim 15, wherein the lateral sides of the slider comprise a hard plastic material.

17. The apparatus according to claim 16, wherein the striker is aligned with the central axial line when the slider is disposed in its base rotational position.

18. The apparatus according to claim 17, further comprising:
- a lever pivotably supported on the slider and coupled to the at least one latch,
- wherein the latch engaging devices are a plurality of latch holes defined in the linear rail.

19. The apparatus according to claim 18, wherein each latch hole has a narrower spacing in its middle than at its ends.

20. A vehicle comprising:
- a vehicle body,
- a vehicle seat mounted on a floor of the vehicle body and having a tiltable seat back, and
- the apparatus of claim 14, wherein the linear rail is fixedly attached to a lateral side of the vehicle body and
- the locking device is fixedly mounted on a lateral side of the seat back and traces an arched path in space when the seat back tilts.

* * * * *